United States Patent [19]

Komoda et al.

[11] Patent Number: 5,332,950
[45] Date of Patent: Jul. 26, 1994

[54] DRIVER CIRCUIT FOR LONG LUMINESCENCE LIFE DISPLAY DEVICE AND METHOD OF DRIVING SUCH DEVICE

[75] Inventors: Motoyoshi Komoda, Tokyo; Minoru Katsumata, Kanagawa, both of Japan

[73] Assignee: NEC Corporation, Tokyo, Japan

[21] Appl. No.: 951,129

[22] Filed: Sep. 25, 1992

[30] Foreign Application Priority Data

Oct. 2, 1991 [JP] Japan .................................. 3-282117

[51] Int. Cl.$^5$ .......................................... H05B 37/00
[52] U.S. Cl. ................................. 315/205; 315/169.3; 315/209 R; 315/176
[58] Field of Search ................ 315/205, 169.3, 209 R, 315/224, 176

[56] References Cited

U.S. PATENT DOCUMENTS

| | | | |
|---|---|---|---|
| 4,667,280 | 5/1987 | Takamura et al. | 363/61 |
| 4,725,768 | 2/1988 | Watanabe | 323/222 |
| 4,845,489 | 7/1989 | Hormel | 315/169.3 X |
| 5,015,921 | 5/1991 | Carlson et al. | 315/208 |

FOREIGN PATENT DOCUMENTS 2538942 7/1984 France .

*Primary Examiner*—Robert J. Pascal
*Assistant Examiner*—Haissa Philogene
*Attorney, Agent, or Firm*—Foley & Lardner

[57] ABSTRACT

A driver circuit for a display device, in which first and second clock pulse generator circuits generate first and second clock pulses to a gate circuit for allowing the first clock pulse to pass when the first and second clock pulses are a high level, and by the output of the gate circuit, a combination of a transistor and an inductance generate a high voltage pulse. The high voltage pulse is rectified in a triple voltage rectifying circuit to output a high voltage output for driving the display device such as EL elements, and the high voltage output can be reset by a low frequency pulse output from a discharge circuit. As a result, no inverter is required, and a small-sized and light-weighted driver circuit is achieved with a long luminescence life of the EL elements and without noises offensive to the ear.

6 Claims, 2 Drawing Sheets

→ TIME

DRIVER CIRCUIT FOR LONG LUMINESCENCE LIFE DISPLAY DEVICE AND METHOD OF DRIVING SUCH DEVICE

BACKGROUND OF THE INVENTION

The present invention relates to a driver circuit for driving a display device, and more particularly to a driver circuit for properly driving electroluminescence (hereinafter referred to as "EL") elements to be used for a back light of a display part of a portable device.

DESCRIPTION OF THE RELATED ARTS

Conventionally, when FL elements are used for a display part of a portable device, an AC voltage of approximately several 10 V to several 100 V with a frequency of approximately 50 Hz to 1 KHz is required for driving the EL elements, and thus a circuit for generating this AC voltage from a DC power source is required.

In a conventional driver circuit for the EL elements, a so-called inverter circuit for generating an AC voltage by using an oscillator circuit including a transistor and a transformer is used.

As described above, in the conventional EL element driver circuit, in order to generate the AC voltage of approximately several 10 V to several 100 V with the frequency of approximately 50 Hz to 1 KHz, the oscillator circuit including the transistor and the transformer is used, and an oscillating frequency of the inverter circuit using this oscillator circuit is the same as a driving frequency of the EL elements.

In the EL element driver circuit of such a construction, when the oscillating frequency is determined to such a low frequency of approximately 50 Hz to 1 KHz, the transformer used becomes large and thus heavy and such a large and heavy transformer is not suitable for a portable device. Further, on the contrary, when the oscillating frequency is determined to a high frequency such as several 10 KHz to several 100 KHz, the transformer can be small-sized and light-weighted. However, by a property of the EL elements that the higher the driving frequency of the EL elements, the lower the luminescence life of the EL elements, it is impossible to satisfy both the small-sizing and light-weighting of the EL element driver circuit and the luminescence life of the EL elements.

Further, when the inverter circuit is operated at a frequency around 1 KHz, a vibration of the transformer comes into the ear of a user and gives an unpleasant feeling to the user of the portable device.

SUMMARY OF THE INVENTION

It is therefore an object of the present invention to provide a display driver circuit in view of the aforementioned defects of the prior art, which is capable of achieving a long luminescence life of EL elements by determining a driving frequency to a low frequency and a small size and a light weight by without using a transformer.

In accordance with one aspect of the present invention, there is provided a driver circuit for applying a driving voltage to a display device, comprising first clock generator means for generating a first clock pulse having a first frequency; second clock generator means for generating a second clock pulse having a second frequency lower than the first frequency; gate means for receiving the first and second clock pulses and allowing the first clock pulse to pass when the second clock pulse is present; high voltage pulse generation means for generating a high voltage pulse in synchronism with the pulse output from the gate means; voltage multiplication rectifying means for performing a voltage multiplication rectifying of the high voltage pulse to obtain a high voltage output; and reset means for resetting the voltage multiplication rectifying means when the second clock pulse is off.

In accordance with another aspect of the present invention, there is provided a method of driving a display device, comprising the steps of generating a first clock pulse having a first frequency; generating a second clock pulse having a second frequency lower than the first frequency; allowing the first clock pulse to pass responsive to the second clock pulse; generating a high voltage pulse in synchronism with the passed first clock pulse; performing a voltage multiplication rectifying of the high voltage pulse to obtain a high voltage output; and resetting the voltage multiplication rectifying operation when the second clock pulse is off.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
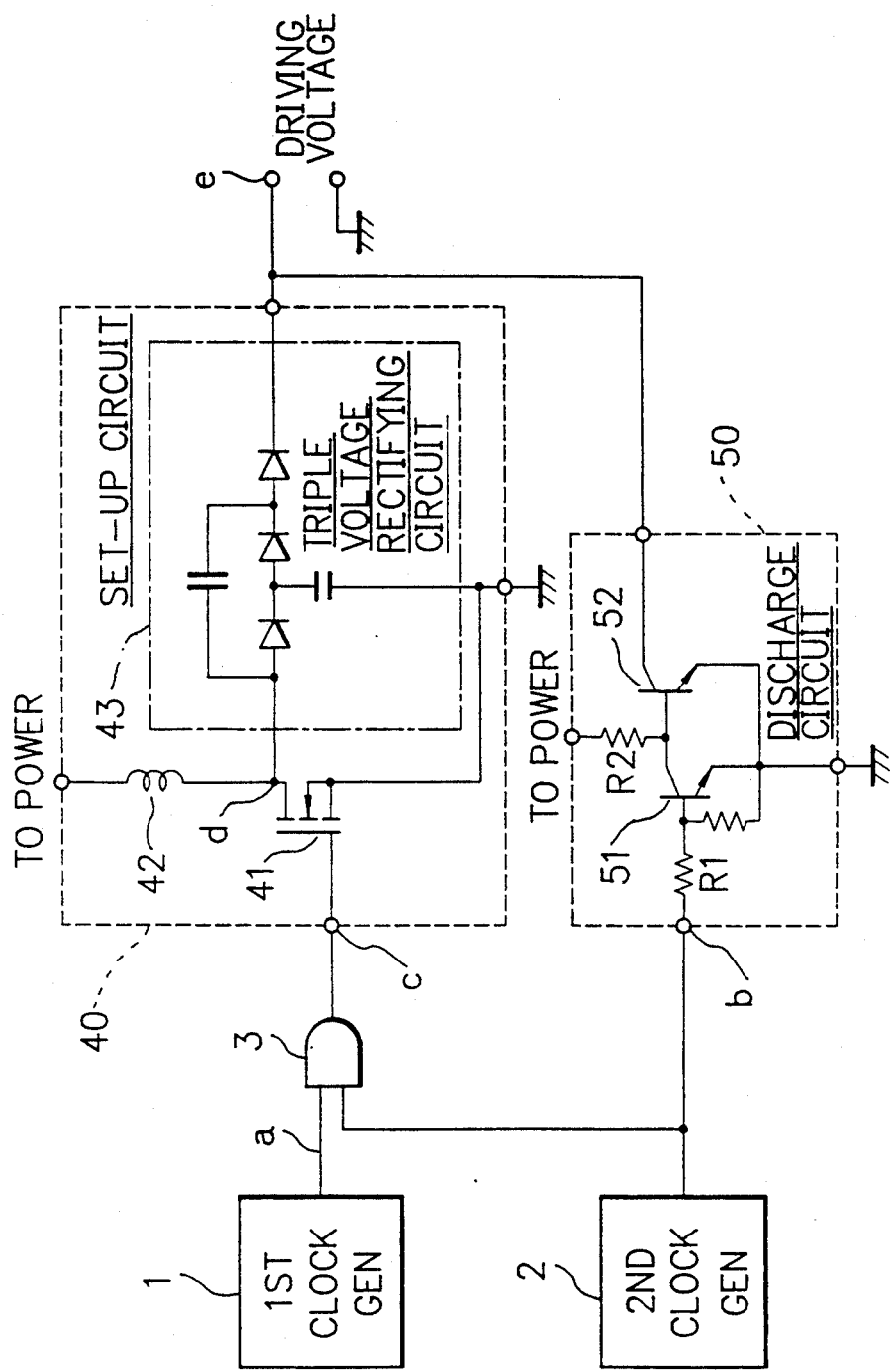
FIG. 1 is a circuit diagram of a driver circuit for a display device according to the present invention.

Referring now to the drawings, there is shown in FIG. 1 one embodiment of a driver circuit for a display device according to the present invention, and FIGS. 2a to 2e show waveforms of signals at predetermined points a to e in the driver circuit shown in FIG. 1.

As shown in FIG. 1, the driver circuit includes a first clock generator circuit 1, a second clock generator circuit 2, an AND gate circuit 3, a voltage rising or step-up circuit 40 and a discharge circuit 50.

The first clock generator circuit 1 for generating a voltage of a high frequency outputs a first clock pulse a having a frequency of approximately 250 KHz to the AND gate circuit 3, and the second clock generator circuit 2 for generating a clock of a low frequency for lighting EL (electroluminescence) elements outputs a second clock pulse b having a frequency of approximately 200 Hz to the AND gate circuit 3 and the discharge circuit 50. Only when the first clock pulse a is a high (H) level and a second clock pulse b is the high level, the AND gate circuit 3 outputs the first clock pulse a to the step-up circuit 40.

The step-up circuit 40 includes an N-channel MOSFET 41, a coil or an inductance 42 and a triple voltage rectifying circuit 43. That is, an output clock pulse c of the AND gate circuit 3 is input to the gate of the N-channel MOSFET 41. The inductance 42 connected between a power source (not shown) and the drain of the N-channel MOSFET 41 via a node d. The triple voltage rectifying circuit 43 is connected between the drain of the N-channel MOSFET 41 via the node d and an output terminal e. The source of the N-channel MOSFET 41 is grounded. In this case, in place of the triple voltage rectifying circuit 43, an n times voltage rectifying circuit may be provided.

The discharge circuit 50 acts as a reset circuit for the triple voltage rectifying circuit 43 and includes first and second transistors 51 and 52 and first and second resistors R1 and R2. That is, the second clock pulse b output from the second clock generator circuit 2 is input to the base of the first transistor 51 via the first resistor R1. The base of the second transistor 52 is connected with the collector of the first transistor 51 and the power source via the second resistor R2. The collector of the second transistor 52 is coupled with the output terminal e. The emitters of the first and second transistors 51 and 52 are grounded.

Next, the operation of the above-described driver circuit shown in FIG. 1 will now be described in connection with FIGS. 2a to 2e.

First, the first clock pulse a output from the first clock generator circuit 1 and the second clock pulse b output from the second clock generator circuit 2 are input to the AND gate circuit 3, and, only when the first clock pulse a is the high level and the second clock pulse b is the high level, the first clock pulse a is output from the AND gate circuit 3 to the step-up circuit 40.

In the step-up circuit 40, when the output clock pulse c of the AND gate circuit 3 is the high level, the N-channel MOSFET 41 is switched on, and a current flows in the inductance 42 connected between the power source and the drain of the N-channel MOSFET 41. In turn, when the output clock pulse c of the AND gate circuit 3 is a low (L) level, the N-channel MOSFET 41 is switched off, and no current flows in the inductance 42.

At a moment when the N-channel MOSFET 41 is switched off, the inductance 42 generates a counter-electromotive voltage and thus a high voltage impulse having a voltage of approximately 100 V is generated at the node d. This impulse is rectified by the triple voltage rectifying circuit 43 to obtain and output an DC voltage of approximately 300 V to the output terminal e.

On the other hand, when the second clock pulse b output from the second clock generator circuit 2 is the low level and the first clock pulse a is not output from the AND gate circuit 3 to the step-up circuit 40, the first transistor 51 of the discharge circuit 50 is turned off and thus the second transistor 52 is switched on. Hence, the electric charge accumulated in a capacitor of the triple voltage rectifying circuit 43 and the EL elements is discharged, and the voltage for driving the EL elements at the output terminal e is immediately fallen to 0 V.

Figure 2:
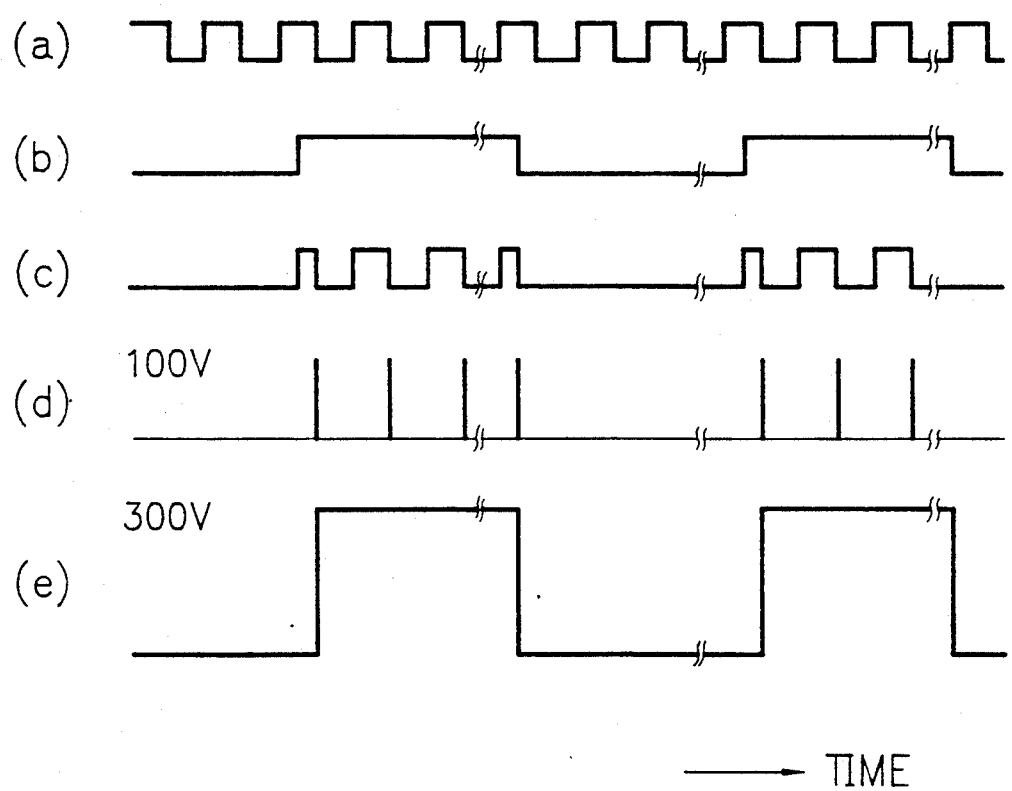
FIGS. 2a to 2e are timing charts showing waveforms of signals shown in FIG. 1.

Accordingly, as described above, an AC voltage having a frequency of approximately 200 Hz with a peak value of approximately 300 V (approximately 100 V rms) is applied to the EL elements, as shown in FIG. 2e.

In this embodiment, although the present invention has been described in connection with the driver circuit for the display device such as the EL elements, the present invention is not restricted to this driver circuit.

According to the present invention, as described above, since the frequency of the clock pulse input to the step-up circuit is raised and the operation period of the step-up circuit is lowered, a clock in an audio band for generating a high voltage is not required, and noises offensive to the ear can be removed. Further, an inverter is not required and thus a small-sizing and a light-weighting of a driver circuit can be achieved.

Further, since the driving frequency of the EL elements can be lowered at the operation period of the step-up circuit, in particular, the drop of the luminescence life of the EL elements can be prevented and the long luminescence life of the same can be obtained. Hence, such EL elements can be used in optimum as a back light of a display part of a portable device.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A driver circuit for applying a driving voltage to a display device, comprising:
   first clock generator means for generating a first clock pulse having a first frequency;
   second clock generator means for generating a second clock pulse having a second frequency lower than said first frequency;
   gate means for receiving said first and second clock pulses and outputting said first clock pulse when said second clock pulse is present;
   high voltage pulse generation means for generating a high voltage pulse in synchronism with said first clock pulse output from said gate means;
   voltage multiplication rectifying means for performing a voltage multiplication rectifying of said high voltage pulse to obtain a high voltage output; and
   reset means for resetting said voltage multiplication rectifying means when said second clock pulse is off.

2. The driver circuit as claimed in claim 1, wherein said gate means is an AND gate, said AND gate outputting said first clock pulse when both said first and second clock pulses are at a high level.

3. The driver circuit as claimed in claim 1, wherein said high voltage pulse generation means includes a coil connected to a power source and a MOSFET connected to said coil, and said first clock pulse output from said gate means is input to said MOSFET.

4. The driver circuit as claimed in claim 1, wherein said voltage multiplication rectifying means is a triple voltage rectifying circuit.

5. The driver circuit as claimed in claim 1, wherein the reset means includes:
   first transistor means having a base and a collector for inputting second clock pulse at base from the second clock generator means; and
   second transistor means having a base connected to collector of first transistor means and a power source via a resistor and a collector connected to an output terminal of the driver circuit.

6. A method of driving a display device, comprising the steps of:
   generating a first clock pulse having a first frequency;
   generating a second clock pulse having a second frequency lower than said first frequency;
   allowing said first clock pulse to pass responsive to said second clock pulse;
   generating a high voltage pulse in synchronism with said passed first clock pulse;
   performing a voltage multiplication rectifying of said high voltage pulse to obtain a high voltage output; and
   resetting said voltage multiplication rectifying operation when said second clock pulse is off.

* * * * *